United States Patent
Hanazawa

(10) Patent No.: US 12,387,361 B2
(45) Date of Patent: Aug. 12, 2025

(54) INFORMATION PROCESSING TO APPROPRIATELY INTERPRET A RECOGNITION RESULT OF AN OBJECT RECOGNITION MODEL

(71) Applicant: SONY SEMICONDUCTOR SOLUTIONS CORPORATION, Kanagawa (JP)

(72) Inventor: Shuhei Hanazawa, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 484 days.

(21) Appl. No.: 17/758,500

(22) PCT Filed: Jan. 4, 2021

(86) PCT No.: PCT/JP2021/000016
§ 371 (c)(1),
(2) Date: Jul. 7, 2022

(87) PCT Pub. No.: WO2021/145227
PCT Pub. Date: Jul. 22, 2021

(65) Prior Publication Data
US 2023/0022458 A1    Jan. 26, 2023

(30) Foreign Application Priority Data
Jan. 17, 2020    (JP) .................................. 2020-005844

(51) Int. Cl.
*G06T 7/00* (2017.01)
*G06T 7/11* (2017.01)
(Continued)

(52) U.S. Cl.
CPC ................. *G06T 7/70* (2017.01); *G06T 7/11* (2017.01); *G06V 10/25* (2022.01);
(Continued)

(58) Field of Classification Search
CPC . G06N 20/00; G06T 7/11; G06T 2207/10024; G06T 2207/20021;
(Continued)

(56) References Cited

U.S. PATENT DOCUMENTS

| 2011/0222734 A1* | 9/2011 | Angot ..................... G06T 7/529 382/106 |
| 2019/0156154 A1 | 5/2019 | Tu et al. |
| 2020/0242398 A1* | 7/2020 | Gudovskiy ............ G06V 10/82 |

FOREIGN PATENT DOCUMENTS

JP    2018-022332 A    2/2018

OTHER PUBLICATIONS

Guidotti, R., Monreale, A. and Cariaggi, L., 2019. Investigating neighborhood generation methods for explanations of obscure image classifiers. In Advances in Knowledge Discovery and Data Mining: 23rd Pacific-Asia Conference, PAKDD 2019, Macau, China, Apr. 14-17, 2019.*

(Continued)

*Primary Examiner* — Li Liu
(74) *Attorney, Agent, or Firm* — CHIP LAW GROUP

(57) ABSTRACT

The present technique relates to an information processing device and an information processing method that enable a recognition result of an object recognition model to be appropriately interpreted. The information processing device includes an interpreting unit that performs interpretation of a recognition result of an object recognition model in units of segments which geometrically divide an image.

(Continued)

For example, the present technique is applied to a device which interprets and explains an object recognition model that performs object recognition in front of a vehicle.

12 Claims, 18 Drawing Sheets

(51) Int. Cl.
  *G06T 7/70* (2017.01)
  *G06V 10/25* (2022.01)
(52) U.S. Cl.
  CPC ............... *G06T 2207/10024* (2013.01); *G06T 2207/30252* (2013.01); *G06V 2201/07* (2022.01)
(58) Field of Classification Search
  CPC . G06T 7/00; G06T 2207/30252; G06V 10/25; G06V 2201/07
  See application file for complete search history.

(56) References Cited

OTHER PUBLICATIONS

Ribeiro, Marco Tulio, Sameer Singh, and Carlos Guestrin. ""Why should i trust you?" Explaining the predictions of any classifier." Proceedings of the 22nd ACM SIGKDD international conference on knowledge discovery and data mining. 2016.*

Chang, Chun-Hao, et al. "Explaining image classifiers by counterfactual generation." arXiv preprint arXiv: 1807.08024 (2018).*

Rezaei, Masoumeh, and Vali Derhami. "Improving LNMF performance of facial expression recognition via significant parts extraction using Shapley value." Journal of AI and Data Mining 7.1 (2019): 17-25.*

Takuji Imai, "Debugging Image Recognition Deep Neural Network Behavior—LIME Technology for Searching for Parts for Contribution to Categorization—Hitachi Ultra LSI Utilized", NIKKEI Robotics, vol. 45, Mar. 10, 2019, pp. 22-26.

International Search Report and Written Opinion of PCT Application No. PCT/JP2021/000016, issued on Feb. 2, 2021, 09 pages of ISRWO.

* cited by examiner

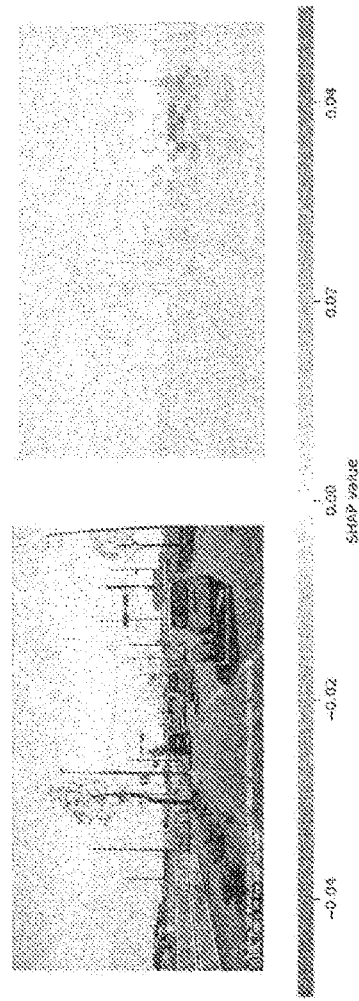

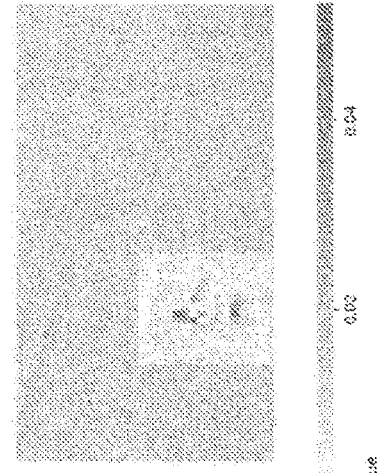
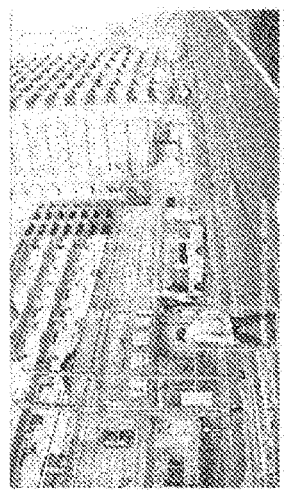
Fig. 10A
Fig. 10B

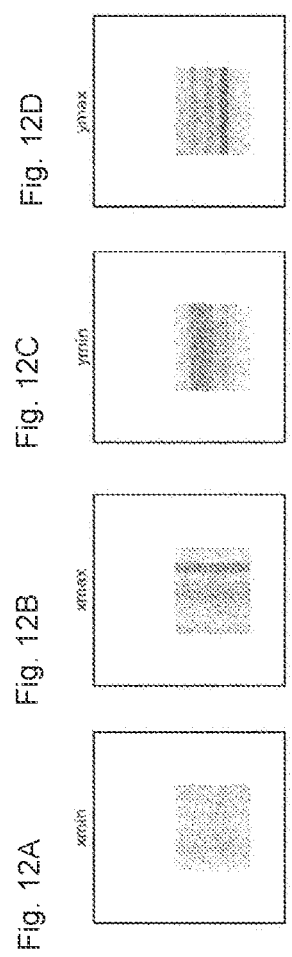

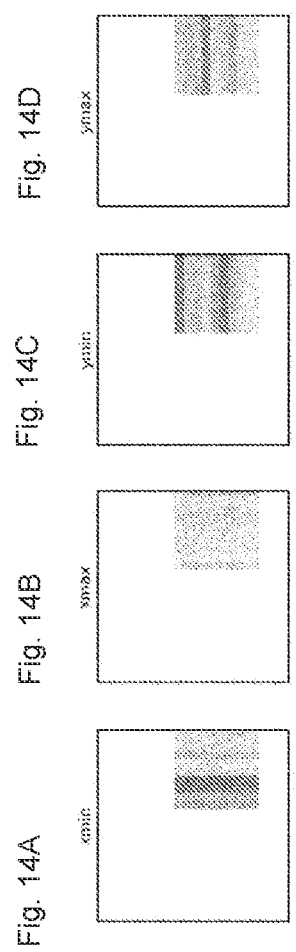

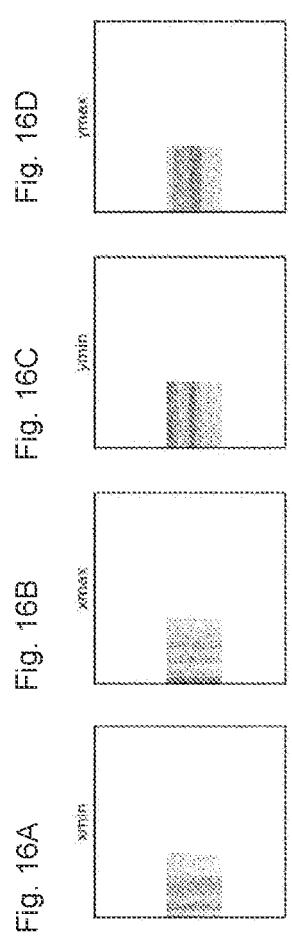

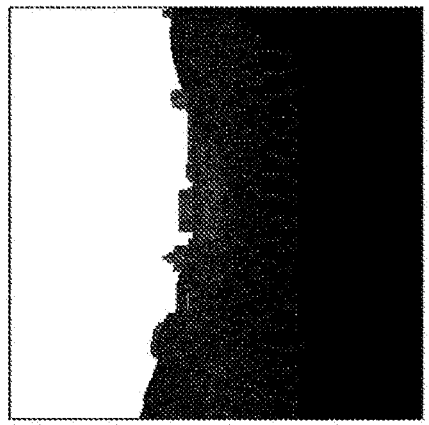

INFORMATION PROCESSING TO APPROPRIATELY INTERPRET A RECOGNITION RESULT OF AN OBJECT RECOGNITION MODEL

CROSS REFERENCE TO RELATED APPLICATIONS

This application is a U.S. National Phase of International Patent Application No. PCT/JP2021/000016 filed on Jan. 4, 2021, which claims priority benefit of Japanese Patent Application No. JP 2020-005844 filed in the Japan Patent Office on Jan. 17, 2020. Each of the above-referenced applications is hereby incorporated herein by reference in its entirety.

TECHNICAL FIELD

The present technique relates to an information processing device, an information processing method, and a program, and more particularly, to an information processing device, an information processing method, and a program that interpret a recognition result of an object recognition model.

BACKGROUND ART

Conventionally, techniques for performing segmentation of an image using a superpixel being a small area made up of a plurality of pixels with similar colors or the like are known (for example, refer to PTL 1).

In addition, a superpixel is conceivably used when interpreting a recognition result of an object recognition model that recognizes a type and an area of an object in an image. In other words, a contribution toward a recognition result of an object recognition model can conceivably be calculated in superpixel units.

CITATION LIST

Patent Literature

[PTL 1]
U.S. Patent Application Publication No. 2019/0156154 (Specification)

SUMMARY

Technical Problem

However, for example, in a case of a small object, a superpixel may end up including not only the object but also a peripheral area thereof. Therefore, a contribution toward a recognition result of the object may not be appropriately obtainable.

The present technique has been devised in view of such circumstances and enables a recognition result of an object recognition model to be appropriately interpreted.

Solution to Problem

An information processing device according to an aspect of the present technique includes an interpreting unit that interprets a recognition result of an object recognition model in units of segments which geometrically divide an image.

An information processing method according to an aspect of the present technique involves having an information processing device interpret a recognition result of an object recognition model in units of segments which geometrically divide an image.

A program according to an aspect of the present technique causes a computer to execute processing of interpreting a recognition result of an object recognition model in units of segments which geometrically divide an image.

In an aspect of the present technique, a recognition result of an object recognition model is interpreted in units of segments which geometrically divide an image.

BRIEF DESCRIPTION OF DRAWINGS

FIGS. 9A and 9B are diagrams showing examples of a sample image and a type recognition explanatory image.

FIGS. 10A and 10B are diagrams showing examples of a sample image and a type recognition explanatory image.

FIGS. 12A, 12B, 12C, and 12D are diagrams showing examples of a left-end recognition explanatory image, a right-end recognition explanatory image, an upper-end recognition explanatory image, and a lower-end recognition explanatory image.

FIGS. 14A, 14B, 14C, and 14D are diagrams showing examples of a left-end recognition explanatory image, a right-end recognition explanatory image, an upper-end recognition explanatory image, and a lower-end recognition explanatory image.

FIGS. 16A, 16B, 16C, and 16D are diagrams showing examples of a left-end recognition explanatory image, a right-end recognition explanatory image, an upper-end recognition explanatory image, and a lower-end recognition explanatory image.

FIGS. 18A and 18B are diagrams showing examples of a sample image and a depth image.

DESCRIPTION OF EMBODIMENT

An embodiment of the present technique will be described below. The description will be presented in the following order.

1. Configuration example of vehicle control system
2. Background
3. Embodiment
4. Modifications
5. Others

1. CONFIGURATION EXAMPLE OF VEHICLE CONTROL SYSTEM

Figure 1:
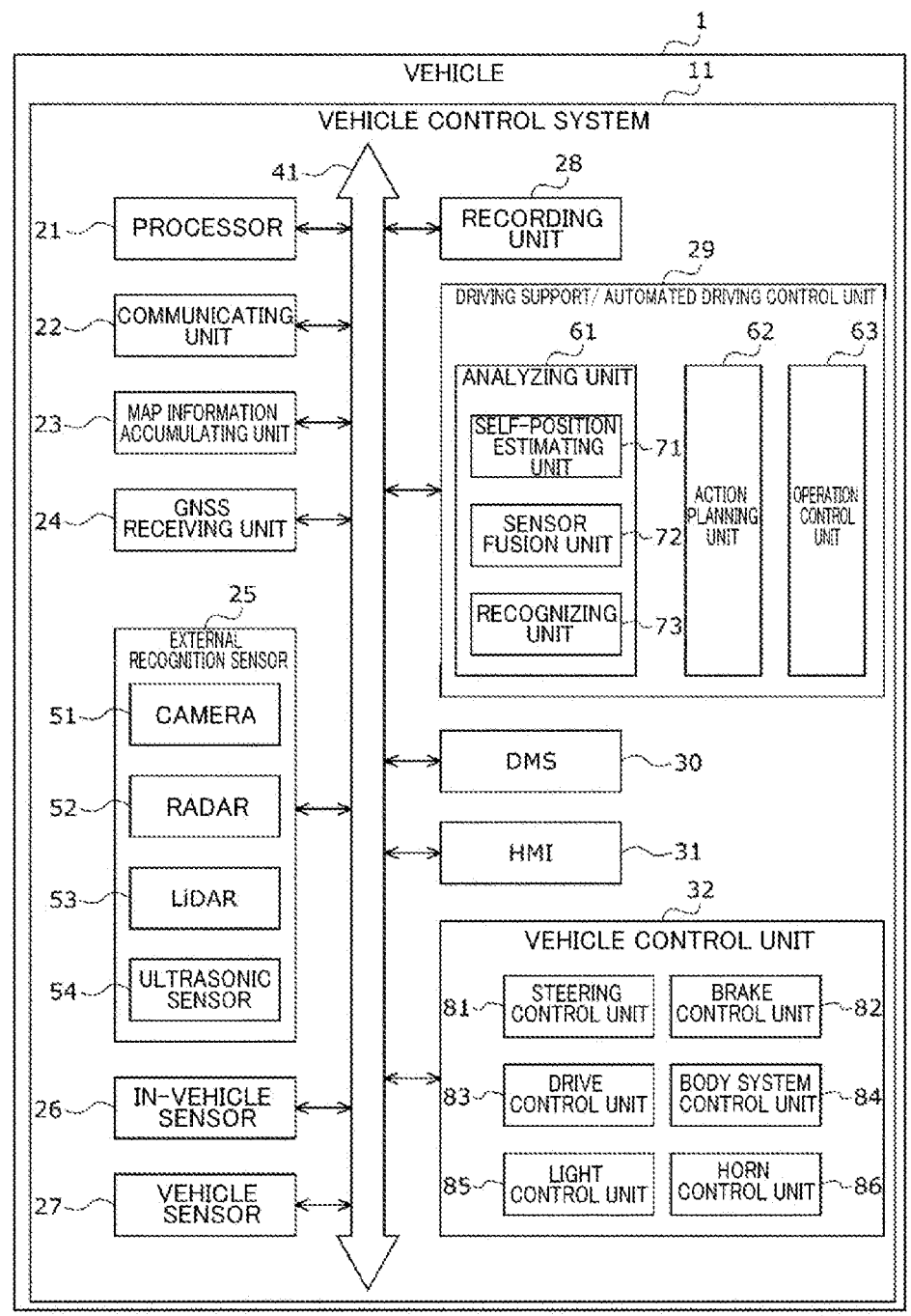
FIG. 1 is a block diagram showing a configuration example of a vehicle control system.

FIG. 1 is a block diagram showing a configuration example of a vehicle control system 11 being an example of a mobile apparatus control system to which the present technique is to be applied.

The vehicle control system 11 is provided in a vehicle 1 and performs processing related to driving support and automated driving of the vehicle 1.

The vehicle control system 11 includes a processor 21, a communicating unit 22, a map information accumulating unit 23, a GNSS (Global Navigation Satellite System) receiving unit 24, an external recognition sensor 25, an in-vehicle sensor 26, a vehicle sensor 27, a recording unit 28, a driving support/automated driving control unit 29, a DMS (Driver Monitoring System) 30, an HMI (Human Machine Interface) 31, and a vehicle control unit 32.

The processor 21, the communicating unit 22, the map information accumulating unit 23, the GNSS receiving unit 24, the external recognition sensor 25, the in-vehicle sensor 26, the vehicle sensor 27, the recording unit 28, the driving support/automated driving control unit 29, the driver monitoring system (DMS) 30, the human machine interface (HMI) 31, and the vehicle control unit 32 are connected to one another via a communication network 41. The communication network 41 is constituted of a vehicle-mounted network such as a CAN (Controller Area Network), a LIN (Local Interconnect Network), a LAN (Local Area Network), FlexRay (registered trademark), or Ethernet (registered trademark), a bus, or the like conforming to any standard. Alternatively, each unit of the vehicle control system 11 may be directly connected by Near Field Communication (NFC), Bluetooth (registered trademark), or the like without involving the communication network 41.

Hereinafter, when each unit of the vehicle control system 11 is to communicate via the communication network 41, a description of the communication network 41 will be omitted. For example, communication performed between the processor 21 and the communicating unit 22 via the communication network 41 will simply be referred to as communication performed between the processor 21 and the communicating unit 22.

The processor 21 is constituted of a processor of various types such as a CPU (Central Processing Unit), an MPU (Micro Processing Unit), or an ECU (Electronic Control Unit). The processor 21 controls the vehicle control system 11 as a whole.

The communicating unit 22 communicates with various devices inside and outside the vehicle, other vehicles, servers, base stations, and the like and performs transmission/reception of various kinds of data. As communication with the outside of the vehicle, for example, the communicating unit 22 receives, from the outside, a program for updating software that controls operations of the vehicle control system 11, map information, traffic information, information on the periphery of the vehicle 1, and the like. For example, the communicating unit 22 transmits, to the outside, information regarding the vehicle 1 (for example, data indicating a state of the vehicle 1 or a recognition result by a recognizing unit 73), information on the periphery of the vehicle 1, and the like. For example, the communicating unit 22 performs communication accommodating vehicle emergency notification systems such as eCall.

A communication method adopted by the communicating unit 22 is not particularly limited. In addition, a plurality of communication methods may be used.

As communication with the inside of the vehicle, for example, the communicating unit 22 performs wireless communication with devices inside the vehicle using a communication method such as wireless LAN, Bluetooth, NFC, or WUSB (Wireless USB). For example, the communicating unit 22 performs wired communication with devices inside the vehicle according to a communication method such as USB (Universal Serial Bus), HDMI (registered trademark) (High-Definition Multimedia Interface), or MHL (Mobile High-definition Link) via a connection terminal (not illustrated) (and a cable if necessary).

In this case, a device in the vehicle is, for example, a device not connected to the communication network 41 in the vehicle. For example, a mobile device or a wearable device carried by an occupant such as a driver or an information device which is carried aboard the vehicle to be temporarily installed therein is assumed.

For example, the communicating unit 22 communicates with a server or the like that is present on an external network (for example, the Internet, a cloud network, or a business-specific network) according to a wireless communication method such as 4G (4th Generation Mobile Communication System), 5G (5th Generation Mobile Communication System), LTE (Long Term Evolution), or DSRC (Dedicated Short Range Communications) via a base station or an access point.

For example, the communicating unit 22 communicates with a terminal present near the vehicle itself (for example, a terminal of a pedestrian or a store or a machine type communication (MTC) terminal) using peer to peer (P2P) technology. For example, the communicating unit 22 performs V2X communication. Examples of V2X communication include Vehicle-to-Vehicle communication with another vehicle, Vehicle-to-Infrastructure communication with a roadside apparatus or the like, Vehicle-to-Home communication with home, and Vehicle-to-Pedestrian communication with a terminal owned by a pedestrian or the like.

For example, the communicating unit 22 receives electromagnetic waves transmitted by a Vehicle Information and Communication System (VICS (registered trademark)) using a radio beacon, a light beacon, FM multiplex broadcast, and the like.

The map information accumulating unit 23 accumulates maps acquired from the outside and maps created by the vehicle 1. For example, the map information accumulating unit 23 accumulates a three-dimensional high-precision map, a global map which is less precise than the high-precision map but which covers a wide area, and the like.

The high-precision map is, for example, a dynamic map, a point cloud map, a vector map (also referred to as an ADAS (Advanced Driver Assistance System) map), or the like. A dynamic map is, for example, a map made up of four layers respectively representing dynamic information, quasi-dynamic information, quasi-static information, and static information and is provided by an external server or the like. A point cloud map is a map made up of point clouds (point group data). A vector map is a map in which information such as positions of lanes and traffic lights are associated with a point cloud map. For example, the point cloud map and the vector map may be provided by an external server or the like or created by the vehicle 1 as a map to be matched with a local map (to be described later) based on sensing results by a radar 52, a LiDAR 53 or the like and accumulated in the map information accumulating unit 23. In addition, when a high-precision map is to be provided by an external server or the like, in order to reduce communication capacity, map data of, for example, a square with several hundred meters per side regarding a planned path to be traveled by the vehicle 1 is acquired from the server or the like.

The GNSS receiving unit 24 receives a GNSS signal from a GNSS satellite and supplies the driving support/automated driving control unit 29 with the GNSS signal.

The external recognition sensor 25 includes various sensors used to recognize a situation outside of the vehicle 1 and supplies each unit of the vehicle control system 11 with sensor data from each sensor. The external recognition sensor 25 may include any type of or any number of sensors.

For example, the external recognition sensor 25 includes a camera 51, the radar 52, the LiDAR (Light Detection and Ranging or Laser Imaging Detection and Ranging) 53, and an ultrasonic sensor 54. The numbers of the camera 51, the radar 52, the LiDAR 53, and the ultrasonic sensor 54 are arbitrary and an example of a sensing area of each sensor will be described later.

As the camera 51, for example, a camera of any photographic method such as a ToF (Time of Flight) camera, a stereo camera, a monocular camera, or an infrared camera is used as necessary.

In addition, for example, the external recognition sensor 25 includes an environmental sensor for detecting weather, meteorological phenomena, brightness, and the like. For example, the environmental sensor includes a raindrop sensor, a fog sensor, a sunshine sensor, a snow sensor, an illuminance sensor, or the like.

Furthermore, for example, the external recognition sensor 25 includes a microphone to be used to detect sound around the vehicle 1, a position of a sound source, or the like.

The in-vehicle sensor 26 includes various sensors for detecting information inside the vehicle and supplies each unit of the vehicle control system 11 with sensor data from each sensor. The in-vehicle sensor 26 may include any type of or any number of sensors.

For example, the in-vehicle sensor 26 includes a camera, a radar, a seat sensor, a steering wheel sensor, a microphone, or a biometric sensor. As the camera, for example, a camera of any photographic method such as a ToF camera, a stereo camera, a monocular camera, or an infrared camera can be used. For example, the biometric sensor is provided on a seat, the steering wheel, or the like and detects various pieces of biological information of an occupant such as the driver.

The vehicle sensor 27 includes various sensors for detecting a state of the vehicle 1 and supplies each unit of the vehicle control system 11 with sensor data from each sensor. The vehicle sensor 27 may include any type of or any number of sensors.

For example, the vehicle sensor 27 includes a velocity sensor, an acceleration sensor, an angular velocity sensor (gyroscope sensor), and an inertial measurement unit (IMU). For example, the vehicle sensor 27 includes a steering angle sensor which detects a steering angle of the steering wheel, a yaw rate sensor, an accelerator sensor which detects an operation amount of the accelerator pedal, and a brake sensor which detects an operation amount of the brake pedal. For example, the vehicle sensor 27 includes a rotation sensor which detects a rotational speed of an engine or a motor, an air pressure sensor which detects air pressure of a tire, a slip ratio sensor which detects a slip ratio of a tire, and a wheel speed sensor which detects a rotational speed of a wheel. For example, the vehicle sensor 27 includes a battery sensor which detects remaining battery life and temperature of a battery and an impact sensor which detects an impact from the outside.

For example, the recording unit 28 includes a ROM (Read Only Memory), a RAM (Random Access Memory), a magnetic storage device such as an HDD (Hard Disc Drive), a semiconductor storage device, an optical storage device, and a magneto-optical storage device. The recording unit 28 records various programs and data to be used by each unit of the vehicle control system 11. For example, the recording unit 28 records a rosbag file which includes messages transmitted and received in a ROS (Robot Operating System) in which an application program related to automated driving runs. For example, the recording unit 28 includes an EDR (Event Data Recorder) or a DSSAD (Data Storage System for Automated Driving) and records information on the vehicle 1 before and after an event such as an accident.

The driving support/automated driving control unit 29 controls driving support and automated driving of the vehicle 1. For example, the driving support/automated driving control unit 29 includes an analyzing unit 61, an action planning unit 62, and an operation control unit 63.

The analyzing unit 61 performs analysis processing of the vehicle 1 and its surroundings. The analyzing unit 61 includes a self-position estimating unit 71, a sensor fusion unit 72, and the recognizing unit 73.

The self-position estimating unit 71 estimates a self-position of the vehicle 1 based on sensor data from the external recognition sensor 25 and the high-precision map accumulated in the map information accumulating unit 23. For example, the self-position estimating unit 71 estimates a self-position of the vehicle 1 by generating a local map based on sensor data from the external recognition sensor 25 and matching the local map and the high-precision map with each other. A position of the vehicle 1 is based on, for example, a center of the rear axle.

The local map is, for example, a three-dimensional high-precision map, an occupancy grid map, or the like created using a technique such as SLAM (Simultaneous Localization and Mapping). The three-dimensional high-precision map is, for example, the point cloud map described earlier. The occupancy grid map is a map indicating occupancy of an object in units of grids of a predetermined size into which a three-dimensional or two-dimensional space surrounding the vehicle 1 is divided. The occupancy of an object is represented by, for example, the presence or absence of the object or an existence probability of the object. The local map is also used in, for example, detection processing and recognition processing of surroundings of the vehicle 1 by the recognizing unit 73.

It should be noted that the self-position estimating unit 71 may estimate a self-position of the vehicle 1 based on an GNSS signal and sensor data from the vehicle sensor 27.

The sensor fusion unit 72 performs sensor fusion processing for obtaining new information by combining sensor data of a plurality of different types (for example, image data supplied from the camera 51 and sensor data supplied from the radar 52). Methods of combining sensor data of a plurality of different types include integration, fusion, and association.

The recognizing unit 73 performs detection processing and recognition processing of surroundings of the vehicle 1.

For example, the recognizing unit 73 performs detection processing and recognition processing of surroundings of the vehicle 1 based on information from the external recognition sensor 25, information from the self-position estimating unit 71, information from the sensor fusion unit 72, and the like.

Specifically, for example, the recognizing unit 73 performs detection processing, recognition processing, and the like of an object in the periphery of the vehicle 1. The detection processing of an object refers to, for example, processing for detecting the presence or absence, a size, a shape, a position, a motion, or the like of an object.

The recognition processing of an object refers to, for example, processing for recognizing an attribute such as a type of an object or identifying a specific object. However, a distinction between detection processing and recognition processing is not always obvious and an overlap may sometimes occur.

For example, the recognizing unit 73 detects an object in the periphery of the vehicle 1 by performing clustering in which a point cloud based on sensor data of a LiDAR, a radar, or the like is classified into blocks of point groups. Accordingly, the presence or absence, a size, a shape, and a position of an object in the periphery of the vehicle 1 are detected.

For example, the recognizing unit 73 detects a motion of an object in the periphery of the vehicle 1 by performing tracking so as to track a motion of a block of point groups having been classified by clustering. Accordingly, a velocity and a travel direction (a movement vector) of the object in the periphery of the vehicle 1 are detected.

For example, the recognizing unit 73 recognizes a type of an object in the periphery of the vehicle 1 by performing object recognition processing such as semantic segmentation with respect to image data supplied from the camera 51.

As an object to be a detection or recognition target, for example, a vehicle, a person, a bicycle, an obstacle, a structure, a road, a traffic light, a traffic sign, or a road sign is assumed.

For example, the recognizing unit 73 performs recognition processing of traffic rules in the periphery of the vehicle 1 based on maps accumulated in the map information accumulating unit 23, an estimation result of a self-position, and a recognition result of an object in the periphery of the vehicle 1. Due to the processing, for example, a position and a state of traffic lights, contents of traffic signs and road signs, contents of road traffic regulations, and travelable lanes are recognized.

For example, the recognizing unit 73 performs recognition processing of a surrounding environment of the vehicle 1. As a surrounding environment to be a recognition target, for example, weather, air temperature, humidity, brightness, and road surface conditions are assumed.

The action planning unit 62 creates an action plan of the vehicle 1. For example, the action planning unit 62 creates an action plan by performing processing of path planning and path following.

Path planning (global path planning) refers to processing of planning a general path from start to goal. The path planning is referred to as trajectory planning and includes processing of trajectory generation (local path planning) which enables safe and smooth progress in the vicinity of the vehicle 1 in consideration of motion characteristics of the vehicle 1 along the path planned by global path planning.

Path following refers to processing of planning an operation for safely and accurately traveling the path planned by path planning within a planned time. For example, a target velocity and a target angular velocity of the vehicle 1 are calculated.

The operation control unit 63 controls operations of the vehicle 1 in order to realize the action plan created by the action planning unit 62.

For example, the operation control unit 63 controls a steering control unit 81, a brake control unit 82, and a drive control unit 83 to perform acceleration/deceleration control and directional control so that the vehicle 1 proceeds along a trajectory calculated by trajectory planning. For example, the operation control unit 63 performs cooperative control in order to realize functions of ADAS such as collision avoidance or shock mitigation, car-following driving, constant-speed driving, collision warning of own vehicle, and lane deviation warning of own vehicle. For example, the operation control unit 63 performs cooperative control in order to realize automated driving or the like in which a vehicle autonomously travels irrespective of manipulations by a driver.

The DMS 30 performs authentication processing of a driver, recognition processing of a state of the driver, and the like based on sensor data from the in-vehicle sensor 26, input data that is input to the HMI 31, and the like. As a state of the driver to be a recognition target, for example, a physical condition, a level of arousal, a level of concentration, a level of fatigue, an eye gaze direction, a level of intoxication, a driving operation, or a posture is assumed.

Alternatively, the DMS 30 may be configured to perform authentication processing of an occupant other than the driver and recognition processing of a state of such an occupant. In addition, for example, the DMS 30 may be configured to perform recognition processing of a situation inside the vehicle based on sensor data from the in-vehicle sensor 26. As the situation inside the vehicle to be a recognition target, for example, temperature, humidity, brightness, or odor is assumed.

The HMI 31 is used to input various kinds of data and instructions and generates an input signal based on input data, an input instruction, or the like and supplies each unit of the vehicle control system 11 with the generated input signal. For example, the HMI 31 includes an operation device such as a touch panel, a button, a microphone, a switch, or a lever, an operation device which accepts input by methods other than manual operations such as voice or gestures, and the like. For example, the HMI 31 may be a remote-controlled device which utilizes infrared light or other radio waves, a mobile device corresponding to operations of the vehicle control system 11, an externally-connected device such as a wearable device, or the like.

In addition, the HMI 31 performs generation and output of visual information, audio information, and tactile information with respect to an occupant or the outside of the vehicle and performs output control for controlling output contents, output timings, output methods, and the like. For example, visual information is information represented by images and light such as an operating screen, a state display of the vehicle 1, a warning display, and a monitor image indicating surroundings of the vehicle 1. For example, audio information is information represented by sound such as a guidance, a warning sound, or a warning message. For example, tactile information is information that is tactually presented to an occupant by a force, a vibration, a motion, or the like.

As a device for outputting visual information, for example, a display apparatus, a projector, a navigation apparatus, an instrument panel, a CMS (Camera Monitoring System), an electronic mirror, or a lamp is assumed. In addition to being an apparatus having a normal display, the display apparatus may be an apparatus for displaying visual information in a field of view of an occupant such as a head-up display, a light-transmitting display, or a wearable device equipped with an AR (Augmented Reality) function.

As a device for outputting audio information, for example, an audio speaker, headphones, or earphones is assumed.

As a device for outputting tactile information, for example, a haptic element or the like using haptic technology is assumed. For example, the haptic element is provided inside a steering wheel, a seat, or the like.

The vehicle control unit 32 controls each unit of the vehicle 1. The vehicle control unit 32 includes the steering control unit 81, the brake control unit 82, the drive control unit 83, a body system control unit 84, a light control unit 85, and a horn control unit 86.

The steering control unit 81 performs detection, control, and the like of a state of a steering system of the vehicle 1. The steering system includes, for example, a steering mechanism including the steering wheel and the like, electronic power steering, and the like. For example, the steering control unit 81 includes a control unit such as an ECU which controls the steering system, an actuator which drives the steering system, and the like.

The brake control unit 82 performs detection, control, and the like of a state of a brake system of the vehicle 1. For example, the brake system includes a brake mechanism including a brake pedal and the like, an ABS (Antilock Brake System), and the like. For example, the brake control unit 82 includes a control unit such as an ECU which controls the brake system, an actuator which drives the brake system, and the like.

The drive control unit 83 performs detection, control, and the like of a state of a drive system of the vehicle 1. For example, the drive system includes an accelerator pedal, a drive force generating apparatus for generating a drive force such as an internal-combustion engine or a drive motor, a drive force transmission mechanism for transmitting the drive force to the wheels, and the like. For example, the drive control unit 83 includes a control unit such as an ECU which controls the drive system, an actuator which drives the drive system, and the like.

The body system control unit 84 performs detection, control, and the like of a state of a body system of the vehicle 1. For example, the body system includes a keyless entry system, a smart key system, a power window apparatus, a power seat, an air conditioner, an airbag, a seatbelt, and a shift lever. For example, the body system control unit 84 includes a control unit such as an ECU which controls the body system, an actuator which drives the body system, and the like.

The light control unit 85 performs detection, control, and the like of a state of various lights of the vehicle 1. As lights to be a control target, for example, a headlamp, a tail lamp, a fog lamp, a turn signal, a brake lamp, a projector lamp, and a bumper display are assumed. The light control unit 85 includes a control unit such as an ECU which controls the lights, an actuator which drives the lights, and the like.

The horn control unit 86 performs detection, control, and the like of a state of a car horn of the vehicle 1. For example, the horn control unit 86 includes a control unit such as an ECU which controls the car horn, an actuator which drives the car horn, and the like.

Figure 2:
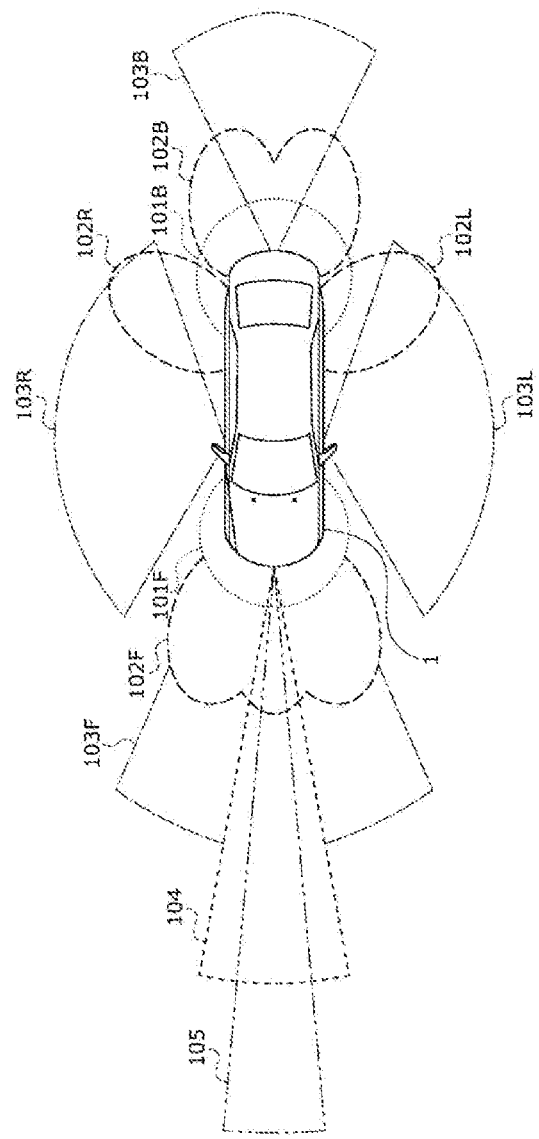
FIG. 2 is a diagram showing an example of sensing areas.

FIG. 2 is a diagram showing an example of sensing areas by the camera 51, the radar 52, the LiDAR 53, and the ultrasonic sensor 54 of the external recognition sensor 25 shown in FIG. 1.

A sensing area 101F and a sensing area 101B represent an example of sensing areas of the ultrasonic sensor 54. The sensing area 101F covers a periphery of a front end of the vehicle 1. The sensing area 101B covers a periphery of a rear end of the vehicle 1.

Sensing results in the sensing area 101F and the sensing area 101B are used to provide the vehicle 1 with parking assistance or the like.

A sensing area 102F to a sensing area 102B represent an example of sensing areas of the radar 52 for short or intermediate distances. The sensing area 102F covers up to a position farther than the sensing area 101F in front of the vehicle 1. The sensing area 102B covers up to a position farther than the sensing area 101B to the rear of the vehicle 1. The sensing area 102L covers a periphery toward the rear of a left-side surface of the vehicle 1. The sensing area 102R covers a periphery toward the rear of a right-side surface of the vehicle 1.

A sensing result in the sensing area 102F is used to detect, for example, a vehicle, a pedestrian, or the like present in front of the vehicle 1. A sensing result in the sensing area 102B is used by, for example, a function of preventing a collision to the rear of the vehicle 1. Sensing results in the sensing area 102L and the sensing area 102R are used to detect, for example, an object present in a blind spot to the sides of the vehicle 1.

A sensing area 103F to a sensing area 103B represent an example of sensing areas by the camera 51. The sensing area 103F covers up to a position farther than the sensing area 102F in front of the vehicle 1. The sensing area 103B covers up to a position farther than the sensing area 102B to the rear of the vehicle 1. The sensing area 103L covers a periphery of the left-side surface of the vehicle 1. The sensing area 103R covers a periphery of the right-side surface of the vehicle 1.

For example, a sensing result in the sensing area 103F is used to recognize a traffic light or a traffic sign, used by a lane deviation prevention support system, and the like. A sensing result in the sensing area 103B is used for parking assistance, used in a surround view system, and the like. Sensing results in the sensing area 103L and the sensing area 103R are used in, for example, a surround view system.

A sensing area 104 represents an example of a sensing area of the LiDAR 53. The sensing area 104 covers up to a position farther than the sensing area 103F in front of the vehicle 1. On the other hand, the sensing area 104 has a narrower range in a left-right direction than the sensing area 103F.

A sensing result in the sensing area 104 is used for, for example, emergency braking, collision avoidance, and pedestrian detection.

A sensing area 105 represents an example of a sensing area of the radar 52 for long distances. The sensing area 105 covers up to a position farther than the sensing area 104 in front of the vehicle 1. On the other hand, the sensing area 105 has a narrower range in the left-right direction than the sensing area 104.

A sensing result in the sensing area 105 is used for, for example, ACC (Adaptive Cruise Control).

It should be noted that the sensing area of each sensor may adopt various configurations other than those shown in FIG. 2. Specifically, the ultrasonic sensor 54 may be configured to also sense the sides of the vehicle 1 or the LiDAR 53 may be configured to also sense the rear of the vehicle 1.

2. BACKGROUND

Next, a background to the present technique will be described.

For example, when performing object recognition with the recognizing unit 73 of the vehicle 1, an object recognition model being a learning model generated using machine learning such as deep learning is used.

On the other hand, in an object recognition model, contents of processing are black-boxed. Therefore, in order to improve performance of an object recognition model and adopt the object recognition model for a product, a technique for interpreting and explaining a recognition result is important.

In this case, interpreting a recognition result of an object recognition model refers to, for example, performing an analysis of factors leading to obtaining the recognition result. Explaining a recognition result of an object recognition model refers to, for example, presenting a result of interpreting the recognition result of the object recognition model by visualization or the like so that the interpretation can be readily understood by a user.

Figure 3:
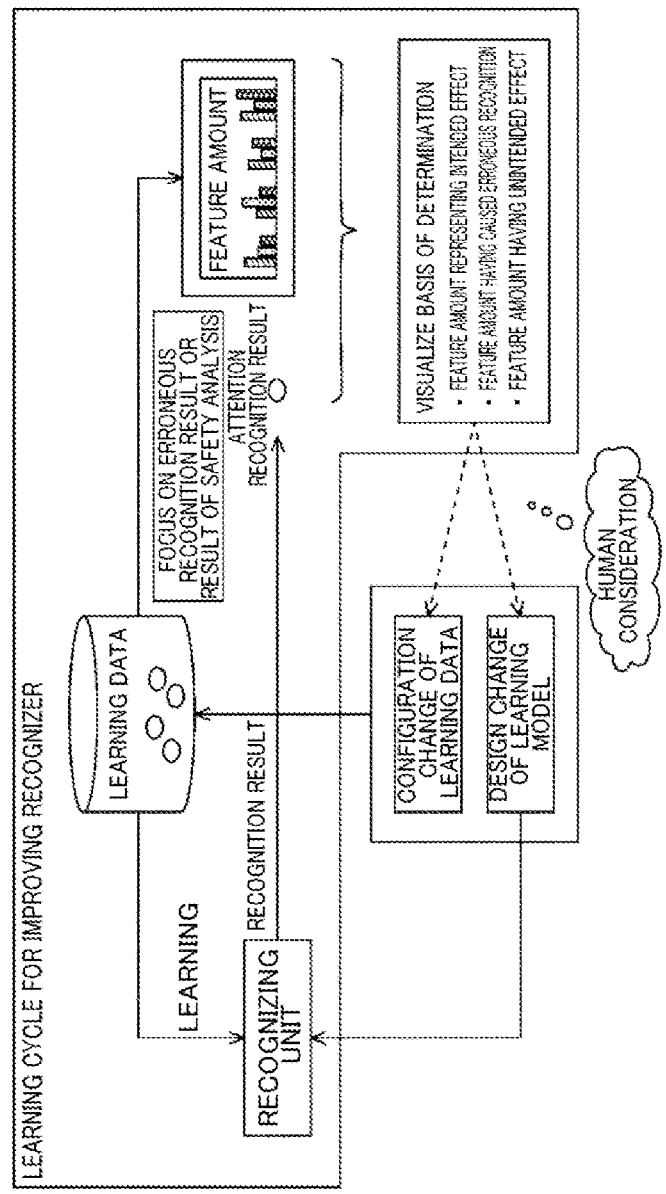
FIG. 3 is a diagram showing an example of a learning cycle for improving performance of a recognizer using an object recognition model.

FIG. 3 shows an example of a learning cycle for improving performance of a recognizer using an object recognition model.

First, the recognizer is provided with learning data and learning is performed. In addition, in the process of learning, a recognition result is output from the recognizer.

Next, for example, an erroneous recognition result or a recognition result focusing on a result of a safety analysis is interpreted. For example, among feature amounts of learning data, a feature amount indicating an intended effect, a feature amount to be a cause of erroneous recognition, a feature amount having an unintended effect, or the like is identified.

In addition, based on a result of interpreting the recognition result, a configuration change of the learning data and a design change of the learning model are performed and learning is performed once again.

Performance of the recognizer improves by repetitively executing this cycle.

A technique for interpreting a recognition result is important in order to establish the learning cycle. In addition, a configuration change of the learning data and a design change of the learning model are usually performed by human consideration. Therefore, a technique for explaining a result of interpreting a recognition result is important.

Furthermore, for example, when objectively presenting characteristics and performance of the recognizer, a technique for interpreting and explaining a recognition result is important.

In consideration of the foregoing, the present technique is designed to enable a recognition result of an object recognition model to be appropriately interpreted and explained.

3. EMBODIMENT

Next, an embodiment of the present technique will be described with reference to FIGS. 4, 5, 6, 7, 8, 9A, 9B, 10A, 10B, 11A, 11B, 12A, 12B, 12C, 12D, 13A, 13B, 14A, 14B, 14C, 14D, 15A, 15B, 16A, 16B, 16C, 16D, and 17.

<Configuration Example of Information Processing Device 201>

Figure 4:
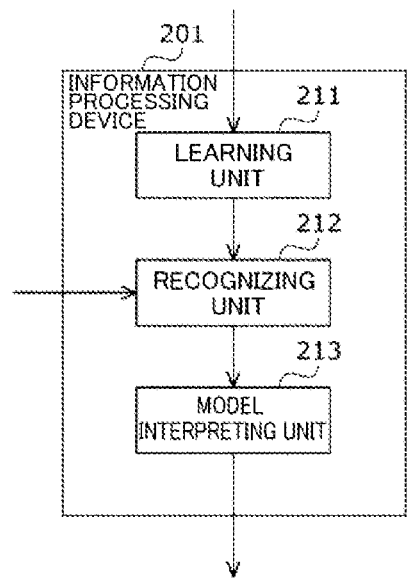
FIG. 4 is a block diagram showing a configuration example of an information processing device to which the present technique is applied.

FIG. 4 shows an example of a configuration of an information processing device 201 to which the present technique is applied.

The information processing device 201 includes a learning unit 211, a recognizing unit 212, and a model interpreting unit 213.

The learning unit 211 performs machine learning using learning data input from the outside and generates an object recognition model. A method of the machine learning used by the learning unit 211 is not particularly limited and, for example, deep learning is used. The learning unit 211 supplies the recognizing unit 212 with the generated object recognition model.

Now, a difference between object recognition and image recognition according to the present specification will be explained.

In object recognition, recognition of a type and an area (position) of an object present in an image is performed. In addition, in object recognition, a type and an area of a plurality of objects in an image may be respectively recognized.

On the other hand, in image recognition, recognition of only a type of an object present in an image is performed and recognition of an area in which the object is present is not performed. In other words, class classification of an object in an image is performed. In addition, in image recognition, even when a plurality of objects are present in an image, only a type of one of the plurality of objects is recognized.

The recognizing unit 212 uses the object recognition model to perform object recognition with respect to a sample image input from the outside. The recognizing unit 212 supplies the model interpreting unit 213 with data indicating a result of object recognition.

The model interpreting unit 213 interprets and explains a recognition result of the recognizing unit 212 or, in other words, a recognition result of the object recognition model generated by the learning unit 211. In addition, the model interpreting unit 213 generates an explanatory diagram for explaining a result of interpreting the recognition result of the object recognition model and outputs the explanatory diagram.

<Configuration Example of Model Interpreting Unit 213>

Figure 5:
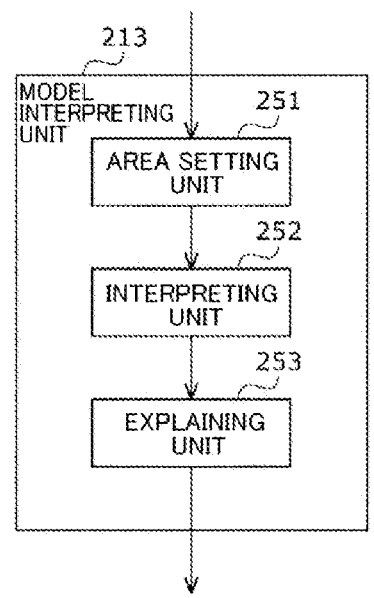
FIG. 5 is a block diagram showing a configuration example of a model interpreting unit.

FIG. 5 shows a configuration example of the model interpreting unit 213 shown in FIG. 4.

The model interpreting unit 213 includes an area setting unit 251, an interpreting unit 252, and an explaining unit 253.

The area setting unit 251 sets an attention area to be a target where interpretation of the object recognition model is to be performed in the sample image. For example, the area setting unit 251 selects an attention object to be a target where interpretation of the object recognition model is to be performed from objects recognized due to object recognition in the sample image and sets an area including the attention object as an attention area. The area setting unit 251 supplies the interpreting unit 252 with data indicating a result of setting the attention area.

The interpreting unit 252 geometrically divides the attention area in the sample image into a plurality of segments and interprets a recognition result of the object recognition model in units of segments. The interpreting unit 252 supplies the explaining unit 253 with data indicating a result of interpreting a recognition result of the object recognition model.

The explaining unit 253 generates an explanatory image for explaining the interpretation of the recognition result of the object recognition model and outputs the explanatory image.

<Model Interpretation Processing>

Figure 6:
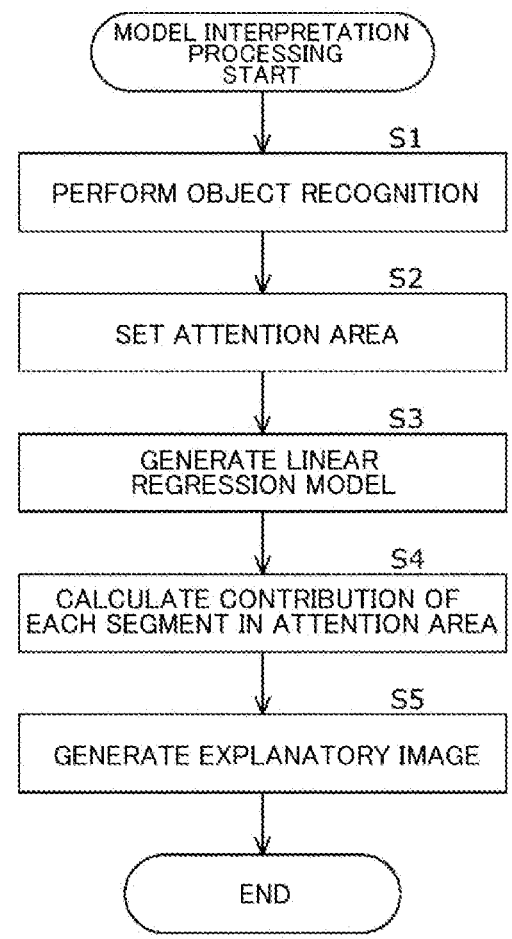
FIG. 6 is a flowchart illustrating model interpretation processing.

Next, object recognition processing to be executed by the information processing device 201 will be described with reference to a flowchart shown in FIG. 6.

The processing is started when, for example, a plurality of sample images to be used to interpret a recognition result of an object recognition model are input to the recognizing unit 212.

In step S1, the recognizing unit 212 performs object recognition. Specifically, the recognizing unit 212 performs object recognition with respect to each sample image using an object recognition model generated in advance by machine learning performed by the learning unit 211. The recognizing unit 212 supplies the area setting unit 251 with data indicating a result of object recognition of each sample image.

Figure 7:
FIG. 7 is a diagram showing an example of a sample image.

FIG. 7 shows an example of data indicating a result of object recognition. This example represents an example in which a plurality of vehicles are recognized in a sample image obtained by photographing the front of a vehicle. In addition, each recognized vehicle is enclosed by a bounding box constituted of a rectangular frame.

In step S2, the area setting unit 251 sets an attention area.

Specifically, in each sample image, the area setting unit 251 selects one attention object from objects recognized due to object recognition.

A method of selecting an attention object is not particularly limited. For example, an object with a largest bounding box, an object present at a front-most position, an object of a predetermined type, or the like is selected as the attention object. Alternatively, for example, the user may select an attention object.

Next, in each sample image, the area setting unit 251 sets a rectangular area including the bounding box enclosing the attention object as an attention area. For example, the attention area is an area which is slightly larger than the bounding box and which has a slight margin around the attention object.

Next, in each sample image, the area setting unit 251 generates an attention area image by masking areas other than the attention area. For example, the area setting unit 251 blacks out areas other than the attention area in each sample image.

Figure 8:
FIG. 8 is a diagram showing an example of an attention area image.

FIG. 8 shows an example of an attention area image which corresponds to the sample image shown in FIG. 7. In this example, an area including a vehicle having been recognized near a bottom-right part of the sample image shown in FIG. 7 has been set as the attention area and areas other than the attention area have been blacked out.

A grid in the attention area will be described later.

The area setting unit 251 supplies the interpreting unit 252 with an attention area image generated from each sample image.

In step S3, the interpreting unit 252 generates a linear regression model.

For example, based on each attention area image, the interpreting unit 252 generates a linear regression model (hereinafter, referred to as an approximate image recognition model) approximating an image recognition model which classifies, into a class, an attention object in the attention area.

In addition, for example, based on each attention area image, the interpreting unit 252 generates a linear regression model (hereinafter, referred to as an approximate area recognition model) approximating an area recognition model which recognizes an area in which an attention object is present in the image.

In step S4, the interpreting unit 252 calculates a contribution of each segment in the attention area.

Specifically, the interpreting unit 252 performs the following processing with respect to each attention area image.

For example, the interpreting unit 252 divides the attention area into a grid pattern. For example, the interpreting unit 252 divides the attention area into a plurality of rectangular, equal-sized segments (hereinafter, referred to as grid segments) of a predetermined number.

FIG. 8 described above represents an example of an attention area image after the attention area is divided into a grid pattern.

In addition, the interpreting unit 252 performs SHAP (SHapley Additive exPlanations) processing with respect to the attention area image using the approximate image recognition model and calculates a SHAP value with respect to each grid segment in the attention area. In other words, the interpreting unit 252 calculates a SHAP value (hereinafter, referred to as a type recognition contribution) indicating a contribution by each grid segment toward recognition (class classification) of a type of an attention object in the attention area.

For example, when a type of an attention object is indicated and a grid segment has a positive contribution toward a score of a label affixed to the attention object (when the grid segment increases the score of the label), the type recognition contribution has a positive value. In addition, the larger the value by which the score of the label is increased by the grid segment, the larger the type recognition contribution. On the other hand, when a grid segment has a negative contribution toward a score of a label affixed to the attention object (when the grid segment reduces the score of the label), the type recognition contribution has a negative value. Furthermore, the larger the value by which the score of the label is reduced by the grid segment, the smaller the type recognition contribution.

In addition, for example, the interpreting unit 252 divides an attention area in an attention area image into strip shapes in a vertical direction. For example, the interpreting unit 252 divides the attention area into a plurality of equal-sized, vertically-long segments (hereinafter, referred to as vertical segments) of which a height is equal to a height of the attention area.

Furthermore, the interpreting unit 252 performs SHAP processing with respect to the attention area image using the approximate area recognition model and calculates two types of SHAP values with respect to each vertical segment in the attention area. In other words, the interpreting unit 252 calculates a SHAP value (hereinafter, referred to as a left-end recognition contribution) indicating a contribution by each vertical segment toward recognition of a position of a left end of a bounding box with respect to an attention object. In addition, the interpreting unit 252 calculates a SHAP value (hereinafter, referred to as a right-end recognition contribution) indicating a contribution by each vertical segment toward recognition of a position of a right end of the bounding box with respect to the attention object.

For example, when a vertical segment operates to shift a left end of a bounding box leftward, the left-end recognition contribution assumes a negative value. In addition, the larger an amount by which the vertical segment shifts the left end of the bounding box leftward, the smaller the left-end recognition contribution. On the other hand, when a vertical segment operates to shift a left end of a bounding box rightward, the left-end recognition contribution assumes a positive value. Furthermore, the larger an amount by which the vertical segment shifts the left end of the bounding box rightward, the larger the left-end recognition contribution.

In addition, for example, when a vertical segment operates to shift a right end of a bounding box leftward, the right-end recognition contribution assumes a negative value. Furthermore, the larger an amount by which the vertical segment shifts the right end of the bounding box leftward, the smaller the right-end recognition contribution. On the other hand, when a vertical segment operates to shift a right end of a bounding box rightward, the right-end recognition contribution assumes a positive value. In addition, the larger an amount by which the vertical segment shifts the right end of the bounding box rightward, the larger the right-end recognition contribution.

Furthermore, for example, the interpreting unit 252 divides an attention area in an attention area image into strip shapes in a horizontal direction. For example, the interpreting unit 252 divides the attention area into a plurality of equal-sized, laterally-long segments (hereinafter, referred to as horizontal segments) of which a width is equal to a width of the attention area.

In addition, the interpreting unit 252 performs SHAP processing with respect to the attention area image using the approximate area recognition model and calculates two types of SHAP values with respect to each horizontal segment in the attention area. In other words, the interpreting unit 252 calculates a SHAP value (hereinafter, referred to as an upper-end recognition contribution) indicating a contribution by each horizontal segment toward recognition of a position of an upper end of a bounding box with respect to an attention object. In addition, the interpreting unit 252 calculates a SHAP value (hereinafter, referred to as a lower-end recognition contribution) indicating a contribution by each horizontal segment toward recognition of a position of a lower end of the bounding box with respect to the attention object.

For example, when a horizontal segment operates to shift an upper end of a bounding box upward, the upper-end recognition contribution assumes a negative value. In addition, the larger an amount by which the horizontal segment shifts the upper end of the bounding box upward, the smaller the upper-end recognition contribution. On the other hand, when a horizontal segment operates to shift an upper end of a bounding box downward, the upper-end recognition contribution assumes a positive value. Furthermore, the larger an amount by which the horizontal segment shifts the upper end of the bounding box downward, the larger the upper-end recognition contribution.

In addition, when a horizontal segment operates to shift a lower end of a bounding box upward, the lower-end recognition contribution assumes a negative value. Furthermore, the larger an amount by which the horizontal segment shifts the lower end of the bounding box upward, the smaller the lower-end recognition contribution. On the other hand, when a horizontal segment operates to shift a lower end of a bounding box downward, the lower-end recognition contribution assumes a positive value. Moreover, the larger an amount by which the horizontal segment shifts the lower end of the bounding box downward, the larger the lower-end recognition contribution.

The interpreting unit 252 supplies the explaining unit 253 with data indicating a calculation result of each contribution with respect to each attention area image.

In step S5, the explaining unit 253 generates an explanatory image.

Specifically, the explaining unit 253 performs the following processing with respect to each attention area image.

For example, the explaining unit 253 generates an image (hereinafter, referred to as a type recognition explanatory image) in which grid segments in an attention area of an attention area image (or a sample image to be a source of an attention area image) are colored according to type recognition contribution.

For example, the explaining unit 253 generates an image (hereinafter, referred to as a left-end recognition explanatory image) in which vertical segments in an attention area of an attention area image (or a sample image to be a source of an attention area image) are colored according to left-end recognition contribution. The explaining unit 253 generates an image (hereinafter, referred to as a right-end recognition explanatory image) in which vertical segments of an attention area image (or a sample image to be a source of an attention area image) are colored according to right-end recognition contribution. The explaining unit 253 generates an image (hereinafter, referred to as an upper-end recognition explanatory image) in which horizontal segments of an attention area image (or a sample image to be a source of an attention area image) are colored according to upper-end recognition contribution. The explaining unit 253 generates an image (hereinafter, referred to as a lower-end recognition explanatory image) in which horizontal segments of an attention area image (or a sample image to be a source of an attention area image) are colored according to lower-end recognition contribution.

The explaining unit 253 outputs each generated explanatory image.

Thereafter, the model interpretation processing ends.

FIG. 9B represents an example of a type recognition explanatory image which corresponds to the sample image in FIG. 9A. It should be noted that the sample image in FIG. 9A is an image similar to the sample image in FIG. 7.

In a type recognition explanatory image, for example, a color of a grid segment of which a type recognition contribution has a positive value is set to translucent green and the larger the type recognition contribution, the darker the color. On the other hand, for example, a color of a grid segment of which a type recognition contribution has a negative value is set to translucent red and the smaller the type recognition contribution, the darker the color. Since the color of each grid segment is translucent, an image in each grid segment is readily visible.

FIG. 10A represents an example of a result of object recognition in a sample image obtained by photographing the front of a vehicle. In this example, in the sample image, a person present slightly towards the left side at the bottom and a traffic light near a left end are recognized.

FIG. 10B represents an example of a type recognition explanatory image in a case where the person recognized in the sample image in-A in FIG. 10A has been set as an attention object.

Figure 11B:
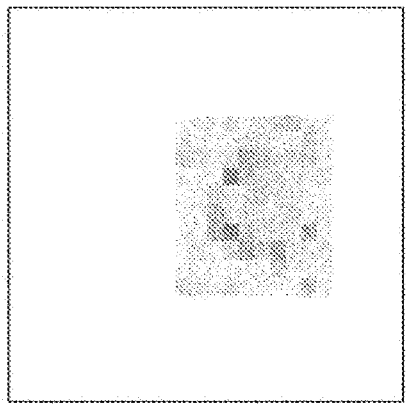
FIGS. 11A and 11B are diagrams showing examples of a sample image and a type recognition explanatory image.
Figure 11A:
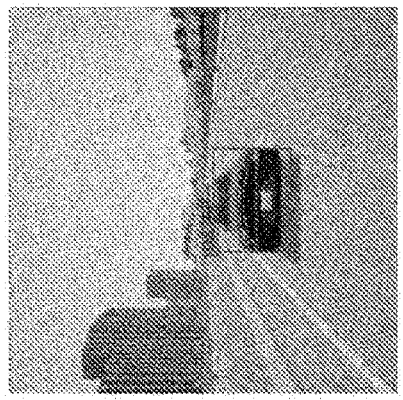

FIG. 11A represents an example of a result of object recognition in a three-dimensional sample image obtained by simulating the front of a vehicle. In this example, in the sample image, a vehicle at center is recognized.

FIG. 11B represents an example of a type recognition explanatory image in a case where the vehicle recognized in the sample image in FIG. 11A has been set as an attention object.

FIGS. 12A, 12B, 12C, and 12D respectively represent examples of a left-end recognition explanatory image (xmin), a right-end recognition explanatory image (xmax), an upper-end recognition explanatory image (ymin), and a lower-end recognition explanatory image (ymax) in a case where the vehicle recognized in the sample image in FIG. 11A has been set as an attention object.

In the left-end recognition explanatory image, for example, a color of a vertical segment of which a left-end recognition contribution assumes a positive value is set to translucent green and the larger the left-end recognition contribution, the darker the color. On the other hand, for example, a color of a vertical segment of which a left-end recognition contribution assumes a negative value is set to translucent red and the smaller the left-end recognition contribution, the darker the color. Since the color of each vertical segment is translucent, an image in each vertical segment is readily visible.

In the right-end recognition explanatory image, for example, a color of a vertical segment of which a right-end recognition contribution assumes a positive value is set to translucent green and the larger the right-end recognition contribution, the darker the color. On the other hand, for example, a color of a vertical segment of which a right-end recognition contribution assumes a negative value is set to translucent red and the smaller the right-end recognition contribution, the darker the color. Since the color of each vertical segment is translucent, an image in each vertical segment is readily visible.

In the upper-end recognition explanatory image, for example, a color of a horizontal segment of which an upper-end recognition contribution assumes a positive value is set to translucent green and the larger the upper-end recognition contribution, the darker the color. On the other hand, for example, a color of a horizontal segment of which an upper-end recognition contribution assumes a negative value is set to translucent red and the smaller the upper-end recognition contribution, the darker the color. Since the color of each horizontal segment is translucent, an image in each horizontal segment is readily visible.

In the lower-end recognition explanatory image, for example, a color of a horizontal segment of which a lower-end recognition contribution assumes a positive value is set to translucent green and the larger the lower-end recognition contribution, the darker the color. On the other hand, for example, a color of a horizontal segment of which a lower-end recognition contribution assumes a negative value is set to translucent red and the smaller the lower-end recognition contribution, the darker the color. Since the color of each horizontal segment is translucent, an image in each horizontal segment is readily visible.

Figure 13A:
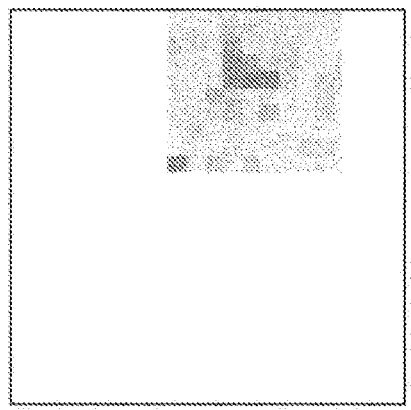
FIGS. 13A and 13B are diagrams showing examples of a sample image and a type recognition explanatory image.

FIG. 13A represents an example of a result of object recognition in a three-dimensional sample image obtained by simulating the front of a vehicle. In this example, in the sample image, a vehicle at a right end is recognized.

Figure 13B:
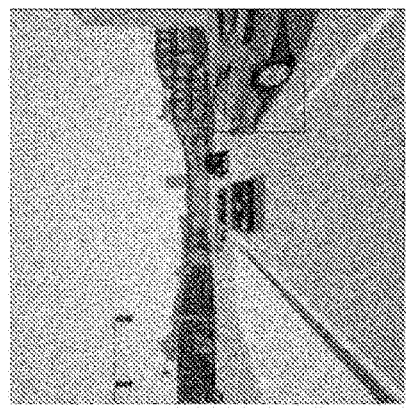

FIG. 13B represents an example of a type recognition explanatory image in a case where the vehicle recognized in the sample image in FIG. 13A has been set as an attention object.

FIGS. 14A, 14B, 14C, and 14D respectively represent examples of a left-end recognition explanatory image, a right-end recognition explanatory image, an upper-end recognition explanatory image, and a lower-end recognition explanatory image in a case where the vehicle recognized in the sample image in FIG. 13A has been set as an attention object.

Figure 15A:
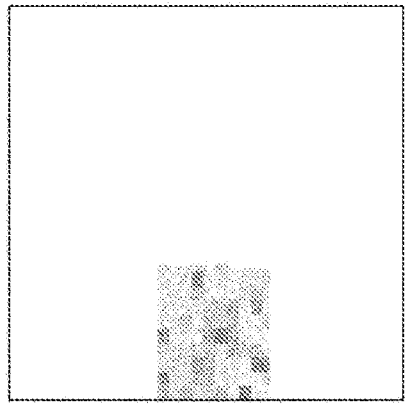
FIGS. 15A and 15B are diagrams showing examples of a sample image and a type recognition explanatory image.

FIG. 15A represents an example of a result of object recognition in a three-dimensional sample image obtained by simulating the front of a vehicle. In this example, in the sample image, a vehicle at a left end is recognized.

Figure 15B:
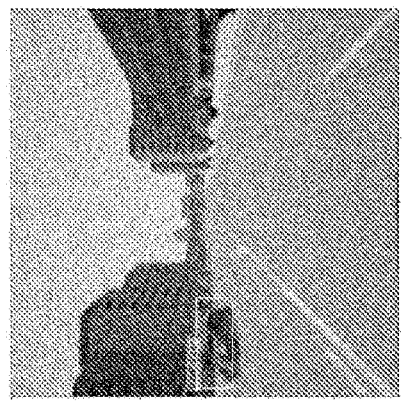

FIG. 15B represents an example of a type recognition explanatory image in a case where the vehicle recognized in the sample image in FIG. 15A has been set as an attention object.

FIGS. 16A, 16B, 16C, and 16D respectively represent examples of a left-end recognition explanatory image, a right-end recognition explanatory image, an upper-end recognition explanatory image, and a lower-end recognition explanatory image in a case where the vehicle recognized in the sample image in FIG. 15A has been set as an attention object.

As described above, an attention area is geometrically divided into a plurality of fine segments without taking a feature amount into consideration, a contribution toward a recognition result of object recognition is calculated in units of segments, and an explanatory image representing the contribution of each segment is generated.

Accordingly, a recognition result of an object recognition model can be interpreted and explained in an appropriate manner. For example, a segment having made a positive or negative contribution toward object recognition in an attention object or a periphery thereof can be readily assessed. In addition, since an image in each segment is readily visible in an explanatory image, a feature amount of an image having made a positive or negative contribution toward object recognition can also be readily assessed.

Figure 17:
FIG. 17 is a diagram showing an example in which a sample image is divided by superpixels.

For example, FIG. 17 represents an example in which a periphery of a vehicle having been set as an attention object in the sample image shown in FIG. 7 is divided into superpixels. In this case, as indicated by a black curved line in the diagram, not only the vehicle but a shadow of the vehicle as well as a building and the like visible beyond the vehicle are also included in one superpixel. In addition, almost all of the vehicle is included in one superpixel.

Therefore, for example, when a recognition result of object recognition is interpreted in units of superpixels, a recognition result of a vehicle being an attention object can no longer be interpreted in an appropriate manner. For example, which portion of the vehicle had made a positive or negative contribution toward a recognition result can no longer be comprehended.

In addition, an amount of calculation can be reduced by limiting interpretation of a recognition result of an object recognition model to within an attention area.

Moreover, for example, when there is leeway in the processing ability of the information processing device 201, all of the areas of a sample image may be geometrically divided and a contribution of each segment may be calculated.

4. MODIFICATIONS

Hereinafter, modifications of the embodiment of the present technique described above will be explained.

For example, when a sample image can be separated into a plurality of channels, interpretation and explanation of a recognition result of an object recognition model can be performed in units of channels.

As an example of a channel image constituting each channel, an R (red) component image, a G (green) component image, a B (blue) component image, a depth image, or the like is assumed.

For example, FIG. 18A represents an example of a three-dimensional sample image obtained by simulating the front of a vehicle. In this example, a vehicle is recognized slightly towards the right side from center in the sample image.

FIG. 18B represents an example of a depth image being one of a plurality of channel images constituting the sample image shown in FIG. 18A.

For example, with respect to the depth image, the model interpreting unit 213 executes the model interpretation processing described earlier with reference to FIG. 6.

Figure 19:
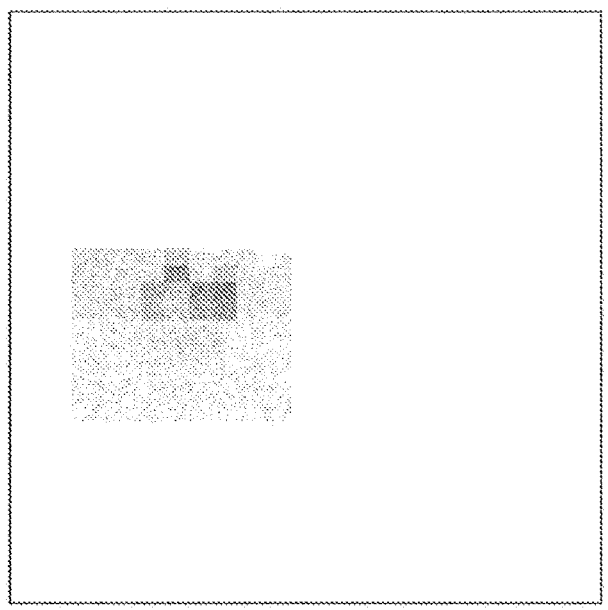
FIG. 19 is a diagram showing an example of a type recognition explanatory image that corresponds to the depth image shown in FIGS. 18A and 18B.

FIG. 19 represents an example of a type recognition explanatory image in a case where model interpretation processing is executed with respect to the depth image shown in FIG. 18B. Accordingly, a contribution toward a recognition result of a type of an object can be obtained by solely focusing on a depth image being one constituent element of a sample image.

In addition, while an example in which an attention area is geometrically divided in at least one of a vertical direction and a horizontal direction has been presented above, an attention area may be geometrically divided according to other methods. For example, an attention area may be divided in a diagonal direction, divided concentrically, or divided concentric-rectangularly. Furthermore, for example, the inside of an attention area may be divided such that rectangular segments line up in an alternating manner in at least one of a vertical direction and a horizontal direction.

Furthermore, while an example of interpreting and explaining a recognition result of an object recognition model which performs object recognition in a periphery of a vehicle has been presented above, applications of an object recognition model to which the present technique is applicable are not particularly limited.

Moreover, while an example in which a contribution toward a recognition result of object recognition is calculated using SHAP has been presented above, a contribution may be calculated using other methods. For example, LIME (local interpretable model-agnostic explanations) may be used.

5. OTHERS

<Configuration Example of Computer>

The above-described series of processing can also be executed by hardware or software. In a case where the series of processing is executed by software, a program that constitutes the software is installed on a computer. In this case, the computer includes, for example, a computer built into dedicated hardware and a general-purpose personal computer in which various programs are installed to enable the personal computer to execute various types of functions.

Figure 20:
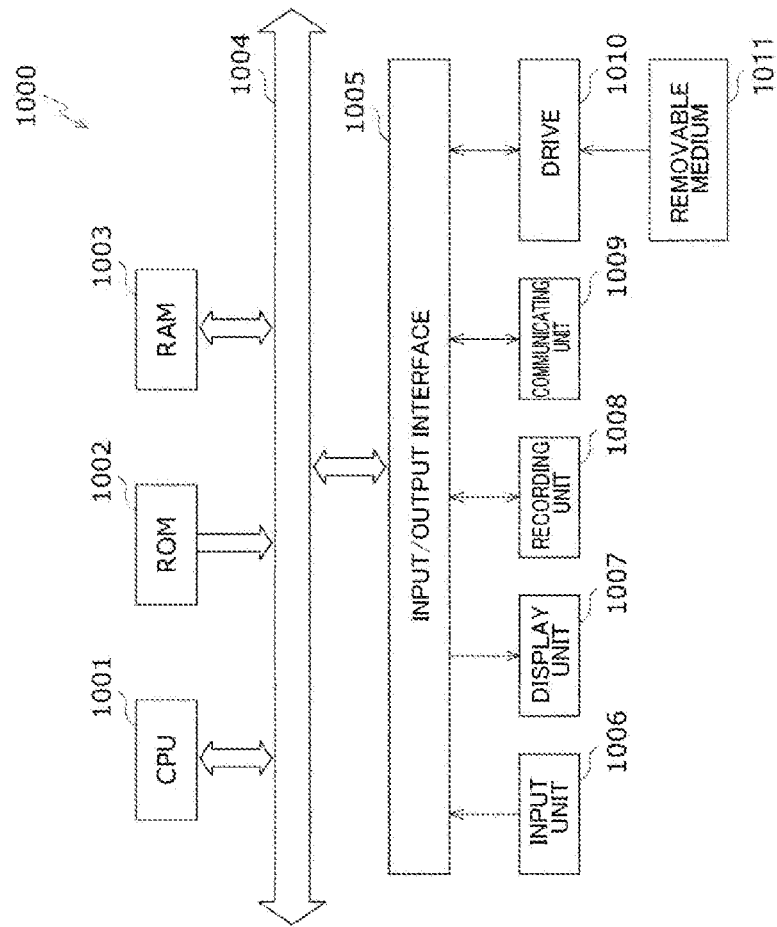

FIG. 20 is a block diagram showing a configuration example of hardware of a computer that executes the aforementioned series of processing using a program.

In a computer 1000, a CPU (Central Processing Unit) 1001, a ROM (Read Only Memory) 1002, and a RAM (Random Access Memory) 1003 are connected to each other by a bus 1004.

An input/output interface 1005 is further connected to the bus 1004. An input unit 1006, an output unit 1007, a recording unit 1008, a communicating unit 1009, and a drive 1010 are connected to the input/output interface 1005.

The input unit 1006 is constituted of an input switch, a button, a microphone, an imaging element, or the like. The output unit 1007 is constituted of a display, a speaker, or the like. The recording unit 1008 is constituted of a hard disk, a nonvolatile memory, or the like. The communicating unit 1009 is constituted of a network interface or the like. The drive 1010 drives a removable medium 1011 such as a magnetic disk, an optical disc, a magneto-optical disk, or a semiconductor memory.

In the computer 1000 configured as described above, for example, the CPU 1001 loads a program recorded on the recording unit 1008 to the RAM 1003 via the input/output interface 1005 and the bus 1004 and executes the program to perform the above-described series of processing.

The program executed by the computer 1000 (the CPU 1001) can be recorded on and provided as, for example, the removable medium 1011 serving as a package medium. The program can also be provided via a wired or wireless transmission medium such as a local area network, the Internet, or digital satellite broadcasting.

In the computer 1000, the program may be installed in the recording unit 1008 via the input/output interface 1005 by inserting the removable medium 1011 into the drive 1010. Furthermore, the program can be received by the communicating unit 1009 via a wired or wireless transfer medium to be installed in the recording unit 1008. Alternatively, the program can be installed in advance in the ROM 1002 or the recording unit 1008.

The program executed by a computer may be a program that performs processing chronologically in the order described in the present specification or may be a program that performs processing in parallel or at a necessary timing such as a called time.

In the present specification, a system means a set of a plurality of constituent elements (devices, modules (components), or the like) and all the constituent elements may or may not be included in a same casing. Accordingly, a plurality of devices accommodated in separate casings and connected via a network and one device in which a plurality of modules are accommodated in one casing both constitute systems.

Further, embodiments of the present technique are not limited to the above-mentioned embodiment and various modifications may be made without departing from the gist of the present technique.

For example, the present technique may be configured as cloud computing in which a plurality of devices share and cooperatively process one function via a network.

In addition, each step described in the above flowchart can be executed by one device or executed in a shared manner by a plurality of devices.

Furthermore, in a case in which one step includes a plurality of processes, the plurality of processes included in the one step can be executed by one device or executed in a shared manner by a plurality of devices.

<Example of Combination of Configurations>

The present technique can be configured as follows.

(1)

An information processing device, including:
an interpreting unit configured to perform interpretation of a recognition result of an object recognition model in units of segments which geometrically divide an image.

(2)

The information processing device according to (1), wherein
the interpreting unit is configured to calculate a contribution toward a recognition result of the object recognition model in units of the segments.

(3)

The information processing device according to (2), further including:
an attention area setting unit configured to set an attention area including an attention object being one of objects recognized by the object recognition model in the image, wherein the interpreting unit is configured to calculate the contribution of each of the segments which geometrically divide the attention area.

(4)

The information processing device according to (3), wherein
the interpreting unit is configured to calculate, with respect to each of the segments dividing the attention area in a grid pattern, the contribution toward a recognition result of a type of the attention object of the object recognition model.

(5)

The information processing device according to (4), wherein
the interpreting unit is configured to calculate the contribution using a model approximating an image recognition model which performs recognition of a type of an object in an image.

(6)

The information processing device according to (5), wherein
the interpreting unit is configured to generate a linear regression model approximating the image recognition model and to calculate the contribution using the linear regression model.

(7)

The information processing device according to any one of (3) to (6), wherein
the interpreting unit is configured to calculate, with respect to each of the segments dividing the attention area in a vertical direction or a horizontal direction, the contribution toward a recognition result of an area in which the attention object is present of the object recognition model.

(8)

The information processing device according to (7), wherein
the interpreting unit is configured to calculate the contribution using a model approximating an area recognition model which performs recognition of an area in which an object is present in an image.

(9)

The information processing device according to (8), wherein
the interpreting unit is configured to generate a linear regression model approximating the area recognition model and to calculate the contribution using the linear regression model.

(10)

The information processing device according to any one of (3) to (9), wherein
the attention area setting unit is configured to set the attention area so as to include an area which has been recognized by the object recognition model and in which the attention object is present.

(11)

The information processing device according to any one of (2) to (10), further including:
an explaining unit configured to generate an explanatory image representing the contribution of each of the segments.

(12)

The information processing device according to (11), wherein
the explanatory image is an image in which each of the segments in the image is colored in a translucent color based on the contribution.

(13)

The information processing device according to any one of (2) to (12), wherein
the interpreting unit is configured to calculate the contribution using LIME (local interpretable model-agnostic explanations) or SHAP (SHapley Additive exPlanations).

(14)

The information processing device according to any one of (1) to (13), wherein
the image can be separated into a plurality of channels, and
the interpreting unit is configured to perform interpretation of a recognition result of the object recognition model in units of the channels.

(15)

An information processing method causing an information processing device to: perform interpretation of a recognition result of an object recognition model in units of segments which geometrically divide an image.

(16)

A program for causing a computer to execute processing of performing interpretation of a recognition result of an object recognition model in units of segments which geometrically divide an image.

The advantageous effects described in the present specification are merely exemplary and are not limited, and other advantageous effects may be obtained.

REFERENCE SIGNS LIST

201 Information processing device
211 Learning unit
212 Recognizing unit
213 Model learning unit
251 Area setting unit
252 Interpreting unit
253 Explaining unit

The invention claimed is:
1. An information processing device, comprising:
a central processing unit (CPU) configured to:
generate an object recognition model;
execute object recognition from an image, based on the object recognition model, wherein
the object recognition is executed to generate a recognition result, and
the recognition result comprises a recognition of a plurality of objects from the image;
select an attention object of the plurality of objects based on the recognition result;
set an attention area in the image, wherein the attention area includes the attention object;
geometrically divide the attention area into a plurality of segments, wherein the plurality of segments includes a horizontal segment and a vertical segment;
calculate a plurality of SHAP (SHapley Additive explanations) values for each of the horizontal segment and the vertical segment, wherein
each SHAP value of the plurality of SHAP values indicates a contribution by each of the horizontal segment and the vertical segment, and
the contribution is toward recognition of a type of the attention object; and
generate a plurality of explanatory images based on the plurality of SHAP values, wherein each explanatory image of the plurality of explanatory images corresponds to a SHAP value of the plurality of SHAP values, and each explanatory image represents the contribution by each of the horizontal segment and the vertical segment.

2. The information processing device according to claim 1, wherein the contribution is toward the recognition result of the object recognition model by each of the horizontal segment and the vertical segment.

3. The information processing device according to claim 1, wherein the calculation of the plurality of SHAP values is based on a model that approximates an image recognition model, and the image recognition model performs recognition of the type of the attention object in the image.

4. The information processing device according to claim 3, wherein the CPU is further configured to generate a linear regression model that approximates the image recognition model, and each SHAP value of the plurality of SHAP values is calculated based on the linear regression model.

5. The information processing device according to claim 1, wherein the CPU is further configured to calculate a contribution toward a recognition result of the attention area.

6. The information processing device according to claim 5, wherein the calculation of the contribution is based on a model that approximates an area recognition model, and the area recognition model performs recognition of the attention area.

7. The information processing device according to claim 6, wherein the CPU is further configured to generate a linear regression model that approximates the area recognition model, and each SHAP value of the plurality of SHAP values is calculated based on the linear regression model.

8. The information processing device according to claim 1, wherein each explanatory image of the plurality of explanatory images is a specific image in which each segment of the plurality of segments is colored in a translucent color, and each segment of the plurality of segments is colored in the translucent color based on the contribution.

9. The information processing device according to claim 2, wherein the CPU is further configured to calculate the contribution based on SHAP (SHapley Additive explanations) processing.

10. The information processing device according to claim 1, wherein the CPU is further configured to:

separate the image into a plurality of channels; and execute interpretation of the recognition result of the object recognition model by the plurality of channels.

11. An information processing method, comprising:

in an information processing device generating an object recognition model;

executing object recognition from an image, based on the object recognition model, wherein the object recognition is executed to generate a recognition result, and the recognition result comprises a recognition of a plurality of objects from the image;

selecting an attention object of the plurality of objects based on the recognition result;

setting an attention area in the image, wherein the attention area includes the attention object;

geometrically dividing the attention area into a plurality of segments, wherein the plurality of segments includes a horizontal segment and a vertical segment;

calculating a plurality of SHAP (SHapley Additive explanations) values for each of the horizontal segment and the vertical segment, wherein each SHAP value of the plurality of SHAP values indicates a contribution by each of the horizontal segment and the vertical segment, and the contribution is toward recognition of a type of the attention object; and generating, a plurality of explanatory images, based on the plurality of SHAP values, wherein each explanatory images of the plurality of explanatory images corresponds to a SHAP value of the plurality of SHAP values, and each explanatory image represents the contribution by each of the horizontal segment and the vertical segment.

12. A non-transitory computer readable medium having stored thereon, computer executable instructions, which when executed by a computer, cause the computer to execute operations, the operations comprising:

generating an object recognition model;

executing object recognition from an image, based on the object recognition model, wherein the object recognition is executed to generate a recognition result, and the recognition result comprises a recognition of a plurality of objects from the image;

selecting an attention object of the plurality of objects based on the recognition result;

setting an attention area in the image, wherein the attention area includes the attention object;

geometrically dividing the attention area into a plurality of segments, wherein the plurality of segments includes a horizontal segment and a vertical segment;

calculating a plurality of SHAP (SHapley Additive exPlanations) values for each of the horizontal segment and the vertical segment, wherein each SHAP value of the plurality of SHAP values indicates a contribution by each of the horizontal segment and the vertical segment, and the contribution is toward recognition of a type of the attention object; and generating, a plurality of explanatory images, based on the plurality of SHAP values, wherein each explanatory images of the plurality of explanatory images corresponds to a SHAP value of the plurality of SHAP values, and each explanatory image represents the contribution by each of the horizontal segment and the vertical segment.

* * * * *